(12) United States Patent
Nagamine et al.

(10) Patent No.: US 8,523,748 B2
(45) Date of Patent: Sep. 3, 2013

(54) CHARGING MEMBER AND PROCESS FOR ITS PRODUCTION

(75) Inventors: Noriko Nagamine, Suntou-gun (JP); Noriaki Kuroda, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/323,776

(22) Filed: Dec. 12, 2011

(65) Prior Publication Data

US 2012/0082481 A1   Apr. 5, 2012

Related U.S. Application Data

(63) Continuation of application No. PCT/JP2011/004556, filed on Aug. 11, 2011.

(30) Foreign Application Priority Data

Aug. 17, 2010   (JP) ................................ 2010-182285

(51) Int. Cl.
   *F16C 13/00*   (2006.01)
   *G03G 15/02*   (2006.01)

(52) U.S. Cl.
   USPC ............... 492/59; 492/53; 492/56; 399/176; 399/111; 399/115

(58) Field of Classification Search
   USPC .................. 492/48, 49, 53, 56, 59; 399/111, 399/115, 176; 29/895, 895.3, 895.32
   See application file for complete search history.

(56) References Cited

U.S. PATENT DOCUMENTS 5,851,657 A * 12/1998 Yasuno et al. ............. 428/332
6,096,429 A *  8/2000 Chen et al. ................. 428/421
7,524,917 B2 *  4/2009 Ootake et al. ............... 528/33
7,664,434 B2 *  2/2010 Kuroda et al. ............. 399/176
7,693,457 B2 *  4/2010 Kuruma et al. ............ 399/176

(Continued)

FOREIGN PATENT DOCUMENTS

JP   58-213023 A   12/1983
JP   2001-173641 A   6/2001

(Continued)

OTHER PUBLICATIONS

Kuroda, et al., U.S. Appl. No. 13/296,202, filed Nov. 14, 2011.

(Continued)

*Primary Examiner* — Essama Omgba
(74) *Attorney, Agent, or Firm* — Fitzpatrick, Cella, Harper & Scinto

(57) ABSTRACT

A charging member is provided which has a surface layer that can more surely keep bleeding from occurring. It is a charging member having a substrate, an elastic layer and a surface layer; the surface layer containing a high-molecular compound having a constituent unit represented by the following formula (1) and a constituent unit represented by the following formula (2), and having an Si—O—Zr linkage.

Formula (1)

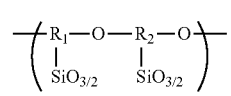

Formula (2)

$ZrO_{4/2}$

7 Claims, 5 Drawing Sheets

(56) References Cited

U.S. PATENT DOCUMENTS

| | | | |
|---|---|---|---|
| 7,962,068 | B2 | 6/2011 | Kuroda et al. |
| 8,064,803 | B2 | 11/2011 | Kuroda et al. |
| 8,092,358 | B2 | 1/2012 | Kuruma et al. |
| 8,227,087 | B2 * | 7/2012 | Mayuzumi et al. ............ 428/447 |
| 8,277,947 | B2 * | 10/2012 | Mayuzumi et al. ............ 428/447 |
| 8,401,425 | B2 * | 3/2013 | Kuroda et al. ................. 399/111 |
| 2009/0080933 | A1 * | 3/2009 | Kuruma et al. ................ 399/111 |
| 2009/0238601 | A1 * | 9/2009 | Kuroda et al. ................. 399/111 |
| 2010/0226684 | A1 | 9/2010 | Mayuzumi et al. |
| 2011/0182617 | A1 * | 7/2011 | Kuruma et al. ................ 399/111 |
| 2011/0182618 | A1 | 7/2011 | Kuruma et al. |
| 2011/0217072 | A1 | 9/2011 | Kuroda et al. |
| 2012/0076535 | A1 * | 3/2012 | Nagamine et al. ............ 399/111 |
| 2012/0093539 | A1 * | 4/2012 | Nagamine et al. ............ 399/111 |
| 2012/0121296 | A1 * | 5/2012 | Kuroda et al. ................. 399/176 |
| 2012/0134709 | A1 * | 5/2012 | Kuroda et al. ................. 399/111 |
| 2012/0141159 | A1 * | 6/2012 | Nagamine et al. ............ 399/111 |
| 2012/0141160 | A1 * | 6/2012 | Tomomizu et al. ........... 399/111 |
| 2012/0141162 | A1 * | 6/2012 | Mayuzumi et al. ........... 399/111 |
| 2012/0301180 | A1 * | 11/2012 | Tomomizu et al. ........... 399/111 |
| 2013/0004206 | A1 * | 1/2013 | Kuroda et al. ................. 399/111 |
| 2013/0034369 | A1 * | 2/2013 | Masu et al. .................... 399/111 |
| 2013/0064571 | A1 * | 3/2013 | Kodama et al. ............... 399/111 |

FOREIGN PATENT DOCUMENTS

| | | |
|---|---|---|
| JP | 2004-37786 A | 2/2004 |
| JP | 2006-293004 A | 10/2006 |
| JP | 2007-4102 A | 1/2007 |
| JP | 2007-232876 A | 9/2007 |
| JP | 2009-58634 A | 3/2009 |
| JP | 2009-151161 A | 7/2009 |
| WO | 2006/070847 A1 | 7/2006 |

OTHER PUBLICATIONS

Nagamine, et al., U.S. Appl. No. 13/315,459, filed Dec. 9, 2011.
Kuroda, et al., U.S. Appl. No. 13/369,105, filed Feb. 8, 2012.
Kuroda, et al., U.S. Appl. No. 13/345,477, filed Jan. 6, 2012.
Tomomizu, et al., U.S. Appl. No. 13/371,200, filed Feb. 10, 2012.
Nagamine, et al., U.S. Appl. No. 13/369,098, filed Feb. 8, 2012.
Nagamine, et al., U.S. Appl. No. 13/311,418, filed Dec. 5, 2011.
Office Action dated Nov. 1, 2012 in U.S. Appl. No. 13/345,477.
English translation of International Preliminary Report on Patentability, International Application No. PCT/JP2011/004556, Mailing Date Mar. 28, 2013.

* cited by examiner

CHARGING MEMBER AND PROCESS FOR ITS PRODUCTION

CROSS-REFERENCE TO RELATED APPLICATIONS

This application is a continuation of International Application No. PCT/JP2011/004556, filed Aug. 11, 2011, which claims the benefit of Japanese Patent Application No. 2010-182285, filed Aug. 17, 2010.

BACKGROUND OF THE INVENTION

1. Field of the Invention

This invention relates to a charging member used for contact charging in electrophotographic apparatus.

2. Description of the Related Art

A charging member provided in contact with an electrophotographic photosensitive member to charge the electrophotographic photosensitive member electrostatically is commonly so constituted as to have an elastic layer containing a rubber, in order to sufficiently and uniformly secure a contact nip between the electrophotographic photosensitive member and the charging member. In such an elastic layer, a low-molecular weight component is inevitably contained, and hence the low-molecular weight component may exude to the surface of the charging member as a result of long-term service to contaminate the surface of the electrophotographic photosensitive member. To cope with such a problem, Japanese Patent Application Laid-Open No. 2001-173641 discloses the constitution that the elastic layer is covered on its periphery with an organic-inorganic hybrid film so as to keep the low-molecular weight component from exuding to the surface of the charging member.

SUMMARY OF THE INVENTION

The present inventors have studied the invention disclosed in the above Japanese Patent Application Laid-Open No. 2001-173641. As the result, the organic-inorganic hybrid film according to Japanese Patent Application Laid-Open No. 2001-173641 was found to have a low crosslink density presumably because it makes much of flexibility. Hence, it has been necessary for the film to have a layer thickness of submicrons or more in order to keep the low-molecular weight component from exuding. However, where the organic-inorganic hybrid film is so formed as to have a layer thickness of submicrons or more, it may have a non-uniform layer thickness, which may make the electrophotographic photosensitive member charged non-uniformly.

Accordingly, the present invention is directed to providing a charging member having a surface layer that can surely keep any low-molecular weight component from bleeding even though it has a thin surface layer. Further, the present invention is directed to providing an electrophotographic apparatus that can provide high quality electrophotographic image.

According to one aspect of the present invention, there is provided a charging member comprising a substrate, an elastic layer and a surface layer, wherein the surface layer comprises a high-molecular compound having a constituent unit represented by the following formula (1) and a constituent unit represented by the following formula (2), and having an Si—O—Zr linkage.

Formula (1)

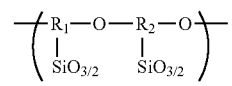

Formula (2)

In the formula (1), $R_1$ and $R_2$ each independently represent any of structures represented by the following formulas (3) to (6).

Formula (3)

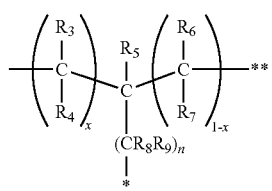

Formula (4)

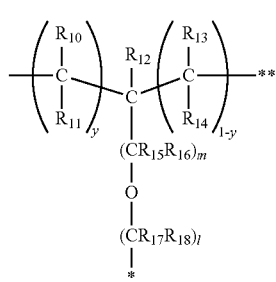

Formula (5)

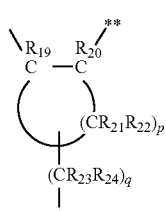

Formula (6)

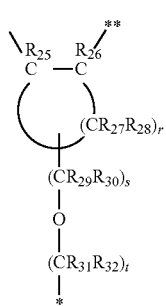

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen, an alkoxyl group or alkyl group having 1 to 4 carbon atom(s); n, m, l, q, s and t each independently represent an integer of 1 or more to 8 or less, p and r each independently represent an integer of 4 to 12, and x and y each independently represent 0 or 1; and an asterisk * and a double asterisk ** each represent the position of bonding with the silicon atom and oxygen atom, respectively, in the formula (1).

According to another aspect of the present invention, there is provided an electrophotographic apparatus comprising an electrophotographic photosensitive member and above described charging member, that is in contact with the electrophotographic photosensitive member.

According to the present invention, it can provide a charging member which makes any marks of its contact with a photosensitive drum not easily appear on images, and a process cartridge and an electrophotographic apparatus which have such a charging member.

According to the present invention, it can provide an electrophotpographic apparatus which provides a high quality electrophotographic image.

DESCRIPTION OF EMBODIMENTS

Figure 1:
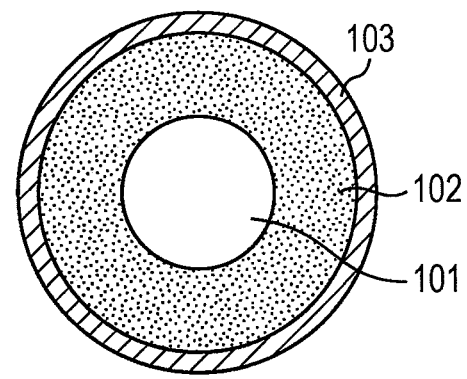
FIG. 1 is a sectional view of the charging member according to the present invention.

The charging member according to the present invention shown in FIG. 1 has a substrate 101 and a conductive elastic layer 102 and a surface layer 103 are layered thereon in this order.

Substrate

As the substrate, a substrate made of a metal (or made of an alloy) may be used which is formed of iron, copper, stainless steel, aluminum, an aluminum alloy or nickel.

Elastic Layer

As a material(s) that constitute(s) the elastic layer, one or two or more type of rubbers or thermoplastic elastomers may be used which are used in elastic layers (conductive elastic layers) of conventional charging members. Specific examples of the rubbers are given below: Urethane rubbers, silicone rubbers, butadiene rubbers, isoprene rubbers, chloroprene rubbers, styrene-butadiene rubbers, ethylene-propylene rubbers, polynorbornene rubbers, styrene-butadiene-styrene rubbers, acrylonitrile rubbers, epichlorohydrin rubbers and alkyl ether rubbers.

Specific examples of the thermoplastic elastomers are given below: Styrene type elastomers and olefin type elastomers. Commercially available products of the styrene type elastomers may include, e.g., RABARON, product name, available from Mitsubishi Chemical Corporation; and SEPTON COMPOUND, product name, available from Kuraray Co., Ltd. Commercially available products of the olefin type elastomers may include, e.g., THERMOLAN, product name, available from Mitsubishi Chemical Corporation; MILASTOMER, product name, available from Mitsui Petrochemical Industries, Ltd.; SUMITOMO TPE, product name, available from Sumitomo Chemical Co., Ltd.; and SANTOPRENE, product name, available from Advanced Elastomer Systems, L.P.A.

The elastic layer may also appropriately make use of a conducting agent so as to have electrical conductivity at a stated value. The elastic layer may have an electrical resistance of approximately from $10^2\Omega$ or more to $10^8\Omega$ or less, and particularly from $10^3\Omega$ or more to $10^6\Omega$ or less.

The conducting agent used in the elastic layer may include, e.g., cationic surface-active agents, anionic surface-active agents, amphoteric surface-active agents, antistatic agents and electrolytes. The elastic layer may also preferably have an Asker-C hardness of 70 degrees or more, and particularly from 73 degrees or more to 92 degrees or less, from the viewpoint of keeping the charging member from deforming when the charging member and the charging object member electrophotographic photosensitive member are brought into contact with each other. The charging member may still also preferably be in what is called a crown shape in which it is larger in thickness at the middle of the elastic layer than at its end portions.

Surface Layer

The surface layer constituting the charging member of the present invention contains a high-molecular compound having an Si—O—Zr linkage, and the high-molecular compound has a constituent unit represented by the following formula (1) and a constituent unit represented by the following formula (2).

Formula (1)

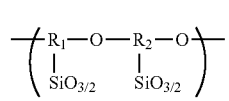

Formula (2)

In the formula (1), $R_1$ and $R_2$ each independently represent any of structures represented by the following formulas (3) to (6).

Formula (3)

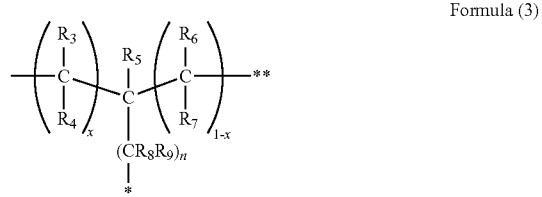

-continued

Formula (4)
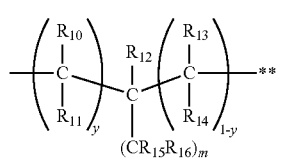

Formula (5)
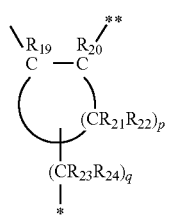

Formula (6)
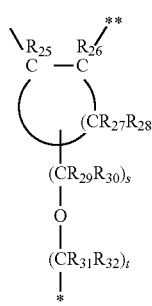

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom or an alkoxyl or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

Figure 8A:
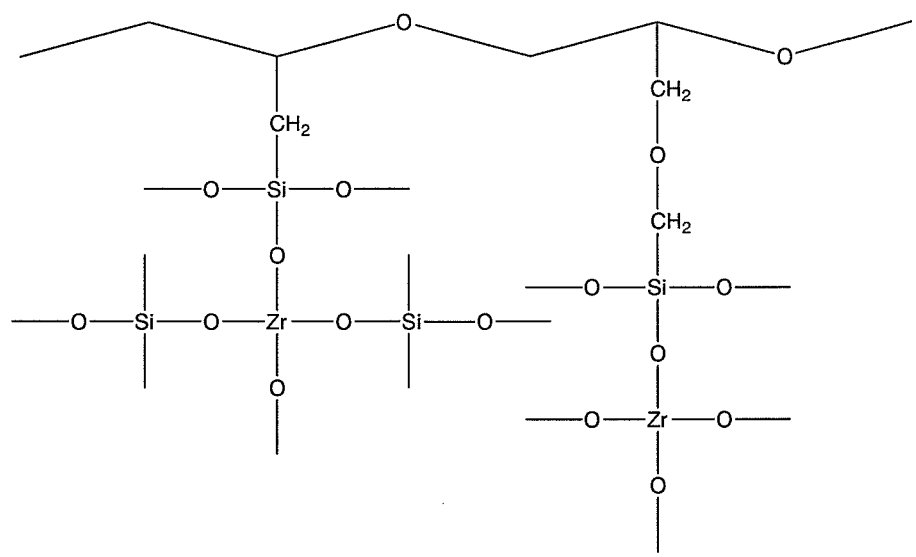
FIG. 8A is a view showing the chemical structure of an example of the high-molecular compound according to the present invention.

As an example of the high-molecular compound according to the present invention, it is so structured that $R_1$ in the general formula (1) is the structure represented by the general formula (3) and $R_2$ is the structure represented by the general formula (4), part of which is shown in FIG. 8A.

Figure 8B:
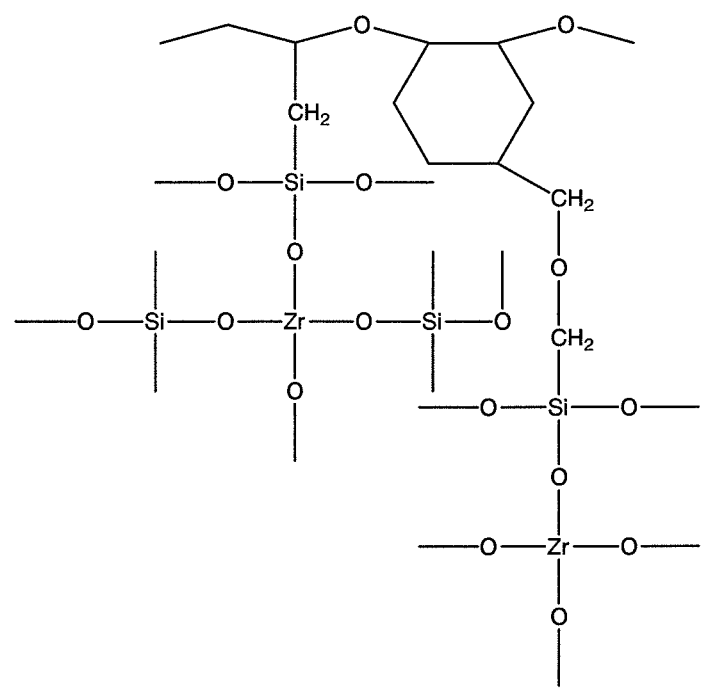
FIG. 8B is a view showing the chemical structure of an example of the high-molecular compound according to the present invention.

As another example of the high-molecular compound according to the present invention, it is so structured that $R_1$ in the formula (1) is the structure represented by the general formula (3) and $R_2$ is the structure represented by the general formula (6), part of which is shown in FIG. 8B.

The high-molecular compound according to the present invention has a high crosslink density because it has the structure wherein siloxane linkages and organic-chain moieties bonded to the silicon atoms stand polymerized one another. Hence, where the surface layer composed of such a high-molecular compound is formed on the elastic layer of the charging member, any low-molecular weight component in the elastic layer can effectively be kept from exuding to the surface of the charging member. In addition, the high-molecular compound, which has the Si—O—Zr linkage therein, brings a superior flexibility where the surface layer has been made thin-film. This enables the surface layer to be effectively kept from, e.g., coming to crack when the charging member is brought into contact with a photosensitive drum.

As $R_1$ and $R_2$ in the formula (1), these may preferably be any structure selected from structures represented by the following formulas (7) to (10). Making them have such structures can make the surface layer tougher and superior in durability. In particular, structures each having an ether group as represented by the following formulas (8) and (10) can make the surface layer more improved in its adherence to the elastic layer.

Formula (7)
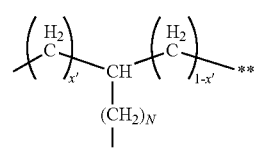

Formula (8)
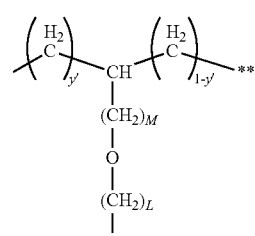

Formula (9)
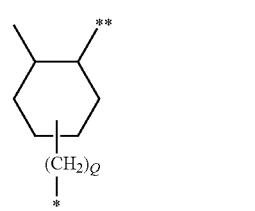

Formula (10)
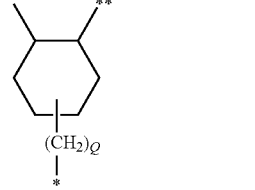

In the formulas (7) to (10), N, M, L, Q, S and T each independently represent an integer of 1 or more to 8 or less, and x' and y' each independently represent 0 or 1.

Making Up of Surface Layer

The high-molecular compound according to the present invention is obtained by subjecting a hydrolyzable compound having a structure represented by the following general formula (11) and a hydrolyzable compound having a structure represented by the following general formula (12), to hydrolysis and dehydration condensation to obtain a condensation product, and thereafter cleaving epoxy groups the condensation product has, to effect cross-linking. Here, the degree of hydrolysis and condensation taking place at the trifunctional moiety of the general formula (11) and the tetrafunctional moiety of the general formula (12) may be controlled to control film properties such as modulus of elasticity and denseness, of the surface layer. Also, the organic-chain moiety of $R_{33}$ in the general formula (11) may be used as a curing site. This enables control of the toughness of the surface layer and the adherence of the surface layer to the elastic layer. $R_{33}$ may also be set to be an organic group having an epoxy group capable of ring-opening by irradiation with ultraviolet rays. This can make curing time shorter than that for any conventional heat-curable materials, and can keep the surface layer from deteriorating thermally.

$$R_{33}-Si(OR_{34})(OR_{35})(OR_{36}) \qquad \text{General formula (11)}$$

$$Zr(OR_{37})(OR_{38})(OR_{39})(OR_{40}) \qquad \text{General formula (12)}$$

In the general formula (11), $R_{33}$ represents any structure selected from structures represented by the following general formulas (13) to (16); and $R_{34}$ to $R_{36}$ each independently represent an alkyl group having 1 to 4 carbon atom(s). In the general formula (12), $R_{37}$ to $R_{40}$ each independently represent an alkyl group having 1 to 9 carbon atom(s).

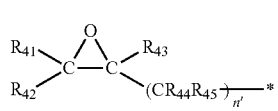

General formula (13)

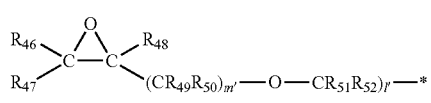

General formula (14)

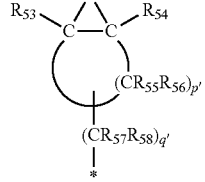

General formula (15)

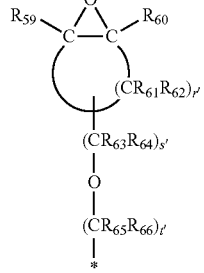

General formula (16)

In the general formulas (13) to (16), $R_{41}$ to $R_{43}$, $R_{46}$ to $R_{48}$, $R_{53}$, $R_{54}$, $R_{59}$ and $R_{60}$ each independently represent a hydrogen atom, a straight-chain or branched-chain alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or a straight-chain or branched-chain alkyl group having 1 to 4 carbon atom(s); $R_{55}$, $R_{56}$, $R_{61}$ and $R_{62}$ each independently represent a hydrogen atom, an alkoxyl group having 1 to 4 carbon atom(s) or a straight-chain or branched-chain alkyl group having 1 to 4 carbon atom(s); $CR_{44}R_{45}$, $CR_{49}R_{50}$, $CR_{51}R_{52}$, $CR_{57}R_{58}$, $CR_{63}R_{64}$ and $CR_{65}R_{66}$ may each be a carbonyl group; at least any two of carbon atoms in $R_{41}$, $R_{42}$, $R_{43}$ and $(CR_{44}R_{45})_{n'}$, at least any two of carbon atoms in $R_{46}$, $R_{47}$, $R_{48}$ and $(CR_{49}R_{50})_{m'}$ and, $R_{53}$ and $R_{54}$, and $R_{59}$ and $R_{60}$ may each combine to make a ring to form a cycloalkane; n', m', l', q', s' and t' each independently represent an integer of 1 to 8, and p' and r' each independently represent an integer of 4 to 12; and an asterisk * represents the position of bonding with the silicon atom in the general formula (11).

The high-molecular compound according to the present invention may preferably be a cross-linked product of the hydrolyzable compounds represented by the above general formulas (11) and (12) and a hydrolyzable compound represented by the following general formula (17). In this case, in token of the solubility of the general formulas (11) and (12) compounds in the stage of synthesis, the coating performance of a surface layer coating solution and the physical properties of a film having been cured, the surface layer can be improved in its electrical properties, as being preferable. In particular, a case in which $R_{67}$ is an alkyl group having 1 to 21 carbon atom(s) is preferable as being improved in the solubility and coating performance. A case in which $R_{67}$ is a phenyl group is also preferable as being contributory to an improvement in the electrical properties, in particular, volume resistivity.

$$R_{67}-Si(OR_{68})(OR_{69})(OR_{70}) \qquad \text{General formula (17)}$$

In the general formula (17), $R_{67}$ represents an alkyl group having 1 to 21 carbon atom(s) or a phenyl group, and $R_{68}$ to $R_{70}$ each independently represent a straight-chain or branched-chain alkyl group having 1 to 6 carbon atom(s).

The charging member according to the present invention may be obtained by forming on the elastic layer a coating film of a coating material containing the above hydrolysis condensation product, and thereafter subjecting the hydrolysis condensation product contained in the coating film, to cross-linking to form the above high-molecular compound therein to make the resultant film serve as the surface layer.

Here, as a production example of the high-molecular compound, a method of forming the high-molecular compound on the elastic layer to obtain the surface layer is specifically described. The high-molecular compound is produced through the following step (1) to step (6). In the following, a component (A) is the hydrolyzable silane compound represented by the general formula (11), a component (B) is the hydrolyzable silane compound represented by the general formula (17) and a component (C) is the hydrolyzable zirconium compound represented by the general formula (12).

(1): The step of adjusting the molar ratio of components (A), (B) and (C), (C)/[(A)+(B)], to from 0.1 or more to 5.0 or less;

(2): the step of mixing the components (A) and (B), and then adding to the resultant mixture a component-(D) water and a component-(E) alcohol, followed by heating and reflux to effect hydrolysis condensation;

(3): the step of adding the component (C) to a solution obtained by effecting the hydrolysis condensation, and mixing these;

(4): the step of adding a component-(F) photopolymerization initiator, and then diluting the resultant mixture with an alcohol to obtain a coating agent (coating material) containing a hydrolysis condensation product;

(5): the step of applying the coating agent onto the elastic layer formed on the substrate; and (6): the step of subjecting the hydrolysis condensation product to cross-linking reaction to cure the coating agent.

Incidentally, the components (A), (B) and (C) may simultaneously be added in the step (2). Also, as to the hydrolyzable silane compounds, only one type of the component (A) may be used, or two or more types of the component (A) may be used, or one or more types of the component (A) and two or more types of the component (B) may be used in combination.

Specific examples of the hydrolyzable silane compound according to the general formula (11) are shown below:
4-(1,2-Epoxybutyl)trimethoxysilane,
5,6-epoxyhexyltriethoxysilane,
8-oxysilan-2-yl octyltrimethoxysilane,
8-oxysilan-2-yl octyltriethoxysilane,
3-glycidoxypropyltrimethoxysilane,
3-glycidoxypropyltriethoxysilane,
1-(3,4-epoxycyclohexyl)ethyltrimethoxysilane,
1-(3,4-epoxycyclohexyl)ethyltriethoxysilane,
3-(3,4-epoxycyclohexyl)methyloxypropyltrimethoxysilane and
3-(3,4-epoxycyclohexyl)methyloxypropyltriethoxysilane.

Specific examples of the compound represented by the general formula (12) are shown below:
Tetramethoxyzirconium, tetraethoxyzirconium,
tetra-n-propoxyzirconium, tetra-i-propoxyzirconium,
tetra-n-butoxyzirconium, tetra-t-butoxyzirconium,
tetra-2-ethylhexanoatozirconium and
tetra-2-methyl-2-butoxyzirconium.

Specific examples of the compound represented by the general formula (17) are shown below:
Methyltrimethoxysilane, methyltriethoxysilane,
ethyltrimethoxysilane, ethyltriethoxysilane,
propyltrimethoxysilane, propyltriethoxysilane,
hexyltrimethoxysilane, hexyltriethoxysilane,
hexyltripropoxysilane, decyltrimethoxysilane,
decyltriethoxysilane, phenyltrimethoxysilane,
phenyltriethoxysilane and phenyltripropoxysilane.

The molar ratio of the above components, (C)/{(A)+(B)}, may preferably be adjusted to from 0.1 or more to 5.0 or less, and much preferably from 0.5 or more to 3.0 or less. As long as it is 0.1 or more, the surface layer may by no means have any too large modulus of elasticity, and any stains may less adhere to its surface even in long-term running performance evaluation, so that any faulty images caused by charging non-uniformity may not occur. Also, as long as it is 5.0 or less, the coating agent can have a good storage stability. As to the amount of the component (D) water to be added, its molar ratio (D)/{(A)+(B)} may preferably be from 0.3 or more to 6.0 or less, and much preferably from 1.2 or more to 3.0 or less. As long as it is 0.3 or more, the condensation can be sufficient, and there may be little unreacted residual monomers. Also, as long as it is 6.0 or less, the condensation can appropriately proceed, and the condensation product may by no means become milky or cause any precipitation.

As the component-(E) alcohol, it is preferable to use a primary alcohol, a secondary alcohol, a tertiary alcohol, a mixed system of a primary alcohol and a secondary alcohol, or a mixed system of a primary alcohol and a tertiary alcohol. It is particularly preferable to use ethanol, a mixed solvent of methanol and 2-butanol, or a mixed solvent of ethanol and 2-butanol.

As the component-(F) photopolymerization initiator, it is preferable to use an onium salt of Lewis acid or Brensted acid. Other cationic polymerization catalyst may include, e.g., borate salts, compounds having an imide structure, compounds having a triazine structure, azo compounds and peroxides. The photopolymerization initiator may preferably beforehand be diluted with a solvent such as an alcohol or a ketone so as to be improved in compatibility with the coating agent.

Among such various cationic polymerization catalysts, an aromatic sulfonium salt or an aromatic iodonium salt is preferred from the viewpoint of sensitivity, stability and reactivity. In particular, a bis(4-tert-butylphenyl) iodonium salt, a compound having a structure represented by the following formula (18) (trade name: ADECAOPTOMER SP150; available from Asahi Denka Kogyo K.K.) and a compound having a structure represented by the following chemical formula (19) (trade name: IRGACURE 261; available from Ciba Specialty Chemicals Inc.) are preferred.

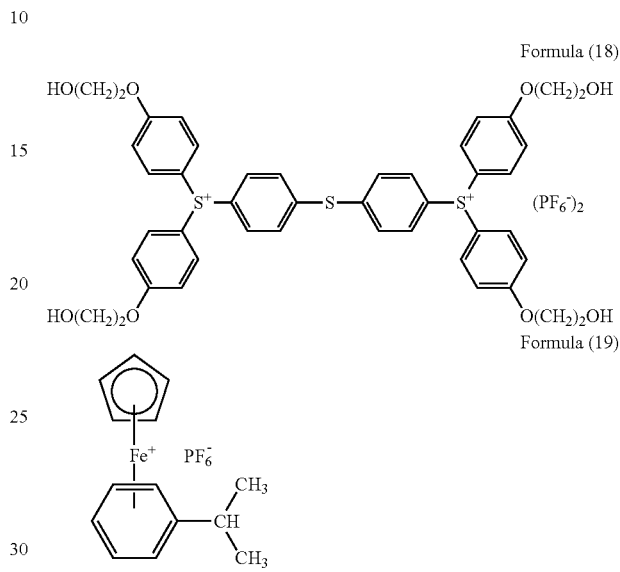

The coating agent synthesized as above is controlled to have a concentration suited for its actual coating. On this occasion, besides the hydrolysis condensation product, any suitable solvent may be used in order to improve coating performance. Such a suitable solvent may include, e.g., alcohols such as methanol and butanol, ethyl acetate, and ketones such as methyl ethyl ketone and methyl isobutyl ketone, or a mixture of any of these. In particular, methanol is preferred.

Formation of Surface Layer

The coating agent having been prepared in this way is coated on the elastic layer by a method such as coating making use of a roll coater, dip coating or ring coating, to form a coating layer. The coating layer is irradiated with activated-energy rays, whereupon cationic-polymerizable groups in a silane hydrolysis condensation product contained in the coating agent undergo cleavage and polymerization. This causes molecules of the silane hydrolysis condensation product to cross-link one another to come cured, thus the surface layer is formed. As the activated-energy rays, ultraviolet rays are preferred. The curing of the surface layer with ultraviolet rays makes any excess heat not easily generated, and any phase separation that may come during volatilization of a solvent as in heat curing can not easily occur, thus a very uniform film state is obtained. This enables the electrophotographic photosensitive member to be provided with uniform and stable potential.

Where the environment in which the charging member is placed is an environment causative of abrupt changes in temperature and humidity, the surface layer may come to wrinkle or crack if the surface layer does not well follow up the expansion and contraction of the elastic layer which have been caused by such changes in temperature and humidity. However, as long as the cross-linking reaction is carried out by ultraviolet radiation, which less generates heat, the adherence between the elastic layer and the surface layer is improved to enable the surface layer to well follow up the expansion and contraction of the elastic layer. Hence, the surface layer can be kept from coming to wrinkle or crack because of the changes in temperature and humidity. In addition, as long as the cross-linking reaction is carried out by ultraviolet radiation, the elastic layer can be kept from deterioration due to heat history, and hence the elastic layer can also be kept from lowering in its electrical properties. In the irradiation with ultraviolet rays, usable are a high-pressure mercury lamp, a metal halide lamp, a low-pressure mercury lamp, an excimer UV lamp and the like. Of these, an ultraviolet radiation source may be used which is rich in light of from 150 nm or more to 480 nm or less in wavelength of ultraviolet rays.

Here, the integral light quantity of ultraviolet radiation is defined as shown below. Ultraviolet radiation integral light quantity (mJ/cm$^2$)=ultraviolet radiation intensity (mW/cm$^2$)×irradiation time (s).

The integral light quantity of ultraviolet radiation may be controlled by selecting irradiation time, lamp output, and distance between the lamp and the irradiation object. The integral light quantity may also be sloped within the irradiation time.

Where the low-pressure mercury lamp is used, the integral light quantity of ultraviolet radiation may be measured with an ultraviolet radiation integral light quantity meter UIT-150-A or UVD-S254 (both are trade names), manufactured by Ushio Inc. Where the excimer UV lamp is used, the integral light quantity of the ultraviolet rays may also be measured with an ultraviolet radiation integral light quantity meter UIT-150-A or VUV-S172 (both are trade names), manufactured by Ushio Inc.

The high-molecular compound according to the present invention may preferably have a condensation rate DC of from 50% or more to 75% or less. The condensation rate DC is an index indicating how far Si atoms stand condensed, and is calculated by using the following mathematical expression.

Mathematical expression 1
$$DC(\%) = \frac{\{(Si-O-Si) + (Si-O-Zr)\} \times 100}{(Si-O-Si) + (Si-O-Zr) + (Si-O-R_{34\text{-}36,68\text{-}70}) + (Si-R_{33,67}) + (Si-OH)}$$

Si—OH represents a state in which the (Si—O—R$_{34\text{-}36, 68\text{-}70}$) has hydrolyzed. Here, the (Si—O—Si) and the (Si—O—Zr) are calculated from peak integral values showing T1 to T3, and the [(Si—O—Si)+(Si—O—Zr)+(Si—O—R$_{34\text{-}36, 68\text{-}70}$)+(Si—R$_{33,67}$)+(Si—OH)] is calculated from a total value of peak integral values within the range where T-component is detected.

The T-component shows a state of Si having one organic group (R) and a total of three hydrolyzable functional groups or bonds formed upon their reaction, as represented by RSi(O—)$_3$, and the numerical values 1 to 3 in T1 to T3 each show the number of bonding with other atoms (Si, Zr) through O, the Si of the T-component has. Then, when the condensation rate is 50% or more, it indicates that the curing of the high-molecular compound has sufficiently proceeded. Meanwhile, a condensation rate of 75% can be made when a tetrafunctional Si as represented by the following structural formula (20) has been introduced into the structure of the high-molecular compound.

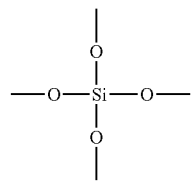

Formula (20)

In the high-molecular compound in the present invention, the ratio of the number of atoms of zirconium to that of silicon, Zr/Si, may preferably be from 0.1 or more to 5.0 or less. In the high-molecular compound according to the present invention, the proportion of Si—O—Zr linkages to Zr—O—Zr linkages, [(Si—O—Zr)/(Zr—O—Zr)], may preferably be 0.1 or more. Where it is 0.1 or more, a uniform solution free of any precipitation or the like can be made up, in which the zirconium stands much dispersed and bonded to the silicon.

Figure 7:
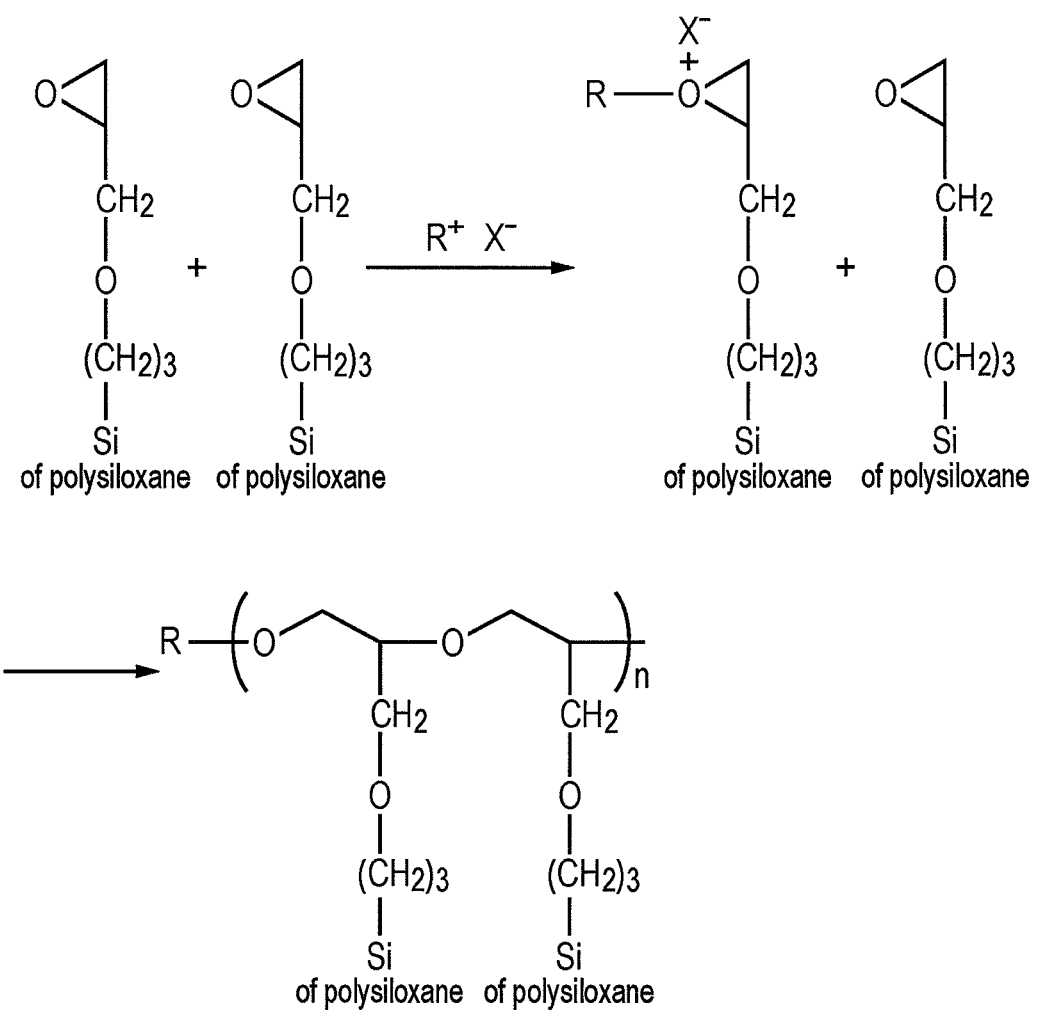
FIG. 7 is an illustration of cross-linking reaction in the step of forming the surface layer according to the present invention.

About the cross-linking and curing reaction that takes place in the course where the high-molecular compound according to the present invention is formed, it is described with reference to FIG. 7. For example, the condensation product obtained by hydrolyzing 3-glycidoxypropyltrimethoxysilane as the component (A) described previously and the components (B) and (C) has epoxy groups as cationic-polymerizable groups. The epoxy groups of such a hydrolysis condensation product undergo ring-opening of epoxy rings in the presence of a cationic polymerization catalyst (represented as R$^+$X$^-$ in FIG. 7), and the polymerization proceeds chain-reactingly. As the result, molecules of a polysiloxane containing ZrO$_{4/2}$ cross-link one another to come cured, thus the high-molecular compound according to the present invention is formed. In FIG. 7, n represents an integer of 1 or more.

Figure 2:
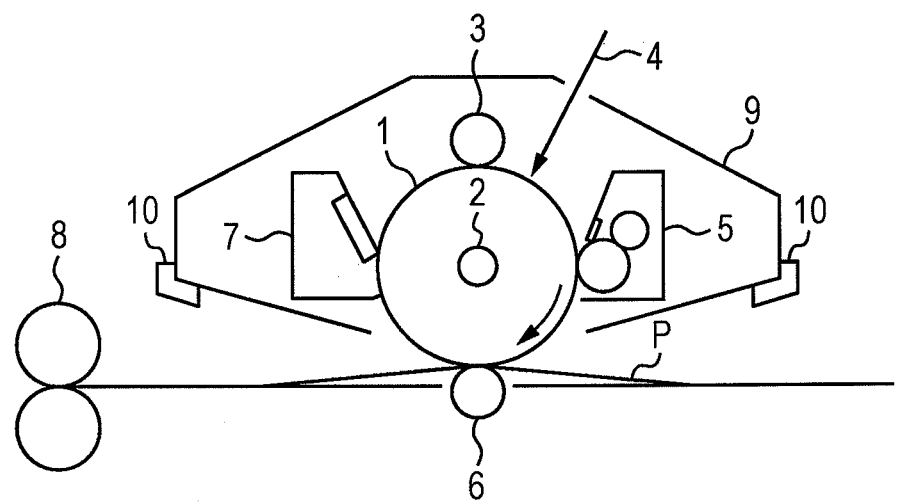
FIG. 2 is a sectional view of an electrophotographic apparatus making use of the charging member according to the present invention.

Image Forming Apparatus and Process Cartridge:

An example of an electrophotographic apparatus provided with a process cartridge in which the charging member of the present invention is used as a charging roller is described with reference to FIG. 2. In the apparatus shown in FIG. 2, a cylindrical electrophotographic photosensitive member 1 is rotatingly driven around a shaft 2 in the direction of an arrow at a stated peripheral speed. As the electrophotographic photosensitive member, what is common is one having a support and an inorganic photosensitive layer or organic photosensitive layer formed on the support. The electrophotographic photosensitive member may also be one having a charge injection layer as a surface layer.

The surface of the electrophotographic photosensitive member 1 being rotatingly driven is uniformly electrostatically charged to a positive or negative, given potential through a charging member 3 (in FIG. 2, a roller-shaped charging member) which is the charging member of the present invention. The electrophotographic photosensitive member thus charged is then exposed to exposure light (imagewise exposure light) 4 emitted from an exposure means (not shown) for slit exposure or laser beam scanning exposure. In this way, electrostatic latent images corresponding to the intended image are successively formed on the surface of the electrophotographic photosensitive member 1.

In charging the surface of the electrophotographic photosensitive member by means of the charging member 3, a voltage of direct-current voltage only or a voltage formed by superimposing an alternating-current voltage on a direct-current voltage is applied to the charging member 3 from a voltage applying means (not shown). In Examples given later, a voltage of direct-current voltage only (−1,000 V) is applied.

Also, in Examples given later, dark-area potential is set at −500 V, and light-area potential at −150 V.

The electrostatic latent images thus formed on the surface of the electrophotographic photosensitive member 1 are developed (reversal development or regular development) with a toner contained in a developer in a developing means 5 to come into toner images. The toner images thus formed and held on the surface of the electrophotographic photosensitive member 1 are then successively transferred by the aid of a transfer bias given from a transfer means (such as a transfer roller) 6; being transferred to a transfer material (such as paper) P. The transfer material is fed from a transfer material feed means (not shown) to the part (contact zone) between the electrophotographic photosensitive member 1 and the transfer means 6 in the manner synchronized with the rotation of the electrophotographic photosensitive member 1.

The developing means may include, e.g., a jumping developing means, a contact developing means and a magnetic-brush developing means. The contact developing means is preferred from the viewpoint of better keeping the toner from scattering. In Examples given later, the contact developing means is employed. As the transfer roller, it may be exemplified by one having a support which is covered thereon with an elastic resin layer controlled to have a medium resistance.

The transfer material P to which the toner images have been transferred is separated from the surface of the electrophotographic photosensitive member 1, is guided into a fixing means 8, where the toner images are fixed, and is then put out of the apparatus as an image-formed material (a print or a copy). In the case of a double-side image formation mode or a multiple image formation mode, this image-formed material is guided into a re-circulation transport mechanism (not shown), and then again guided to the transfer section.

The surface of the electrophotographic photosensitive member 1 from which the toner images have been transferred is brought to removal of the developer (toner) remaining after the transfer, through a cleaning means (such as a cleaning blade) 7. Thus the electrophotographic photosensitive member is cleaned on its surface. It is further subjected to charge elimination by pre-exposure light (not shown) emitted from a pre-exposure means (not shown), and thereafter repeatedly used for the formation of images. Incidentally, where the charging means is a contact charging means, the pre-exposure is not necessarily required.

The apparatus may be constituted of a combination of plural components held in a container and integrally joined as a process cartridge from among the constituents such as the above electrophotographic photosensitive member 1, charging member 3, developing means 5, transfer means 6 and cleaning means 7. Then, this process cartridge may be so set up as to be detachably mountable to the main body of the electrophotographic apparatus such as a copying machine or a laser beam printer. In what is shown in FIG. 2, the electrophotographic photosensitive member 1, the primary charging unit 3, the developing means 5 and the cleaning means 7 are integrally supported in the cartridge to form a process cartridge 9 that is detachably mountable to the main body of the electrophotographic apparatus through a guide means 10 such as rails provided in the main body of the electrophotographic apparatus.

EXAMPLES

The present invention is described below in greater detail by giving working examples. In the following working examples, "part(s)" refers to "part(s) by mass".

Example 1

(1) Formation and evaluation of conductive elastic layer

Materials shown in Table 1 were mixed by means of a 6-liter pressure kneader (product name: TD6-15MDX; manufactured by Toshin Co., Ltd.) for 24 minutes in a packing of 70 vol. % and at a number of blade revolutions of 30 rpm to obtain an unvulcanized rubber composition.

TABLE 1

| Materials | Amount |
| --- | --- |
| Medium/high-nitrile NBR (trade name: NIPOL DN219; bound acrylonitrile content center value: 33.5%; Mooney viscosity center value: 27; available from Nippon Zeon Co., Ltd.) | 100 parts |
| Carbon black for color (filler) (trade name: #7360SB; particle diameter: 28 nm; nitrogen adsorption specific surface area: 77 $m^2$/g; DBP oil absorption: 87 $cm^3$/100 g; available from Tokai Carbon Co., Ltd.) | 48 parts |
| Calcium carbonate (filler) (trade name: NANOX #30; available from Maruo Calcium Co., Ltd.) | 20 parts |
| Zinc oxide | 5 parts |
| Stearic acid | 1 part |

To 174 parts by mass of this unvulcanized rubber composition, 4.5 parts of tetrabenzylthiuram disulfide (trade name: SANCELER TBzTD; available from Sanshin Chemical Industry Co., Ltd.) as a vulcanization accelerator and 1.2 parts of sulfur as a vulcanizing agent were added. Then, these were mixed by means of an open roll of 12 inches in roll diameter at a number of front-roll revolutions of 8 rpm and a number of back-roll revolutions of 10 rpm and at a roll gap of 2 mm, carrying out right and left 20 cuts in total. Thereafter, the roll gap was changed to 0.5 mm to carry out tailing 10 times to obtain a kneaded product 1 for elastic layer.

Next, a support made of steel (one having been surface-plated with nickel) in a columnar shape of 6 mm in diameter and 252 mm in length was readied. Then, this support was coated with a metal- and rubber-containing heat-hardening adhesive (trade name: METALOC U-20, available from Toyokagaku Kenkyusho Co., Ltd.) over the areas up to 115.5 mm from the both sides interposing the middle of the column surface in the axial direction (the areas of 231 mm in total in width in the axial direction). The wet coating thus formed was dried at 80° C. for 30 minutes, and thereafter further dried at 120° C. for 1 hour.

The kneaded product 1 was extruded simultaneously with the above support (mandrel) with adhesive layer while being shaped coaxially around the mandrel and in the shape of a cylinder of 8.75 mm to 8.90 mm in diameter, by extrusion making use of a cross head. The extruded product obtained was cut at its end portions to produce a conductive elastic roller the mandrel of which was covered on the outer periphery thereof with an unvulcanized conductive elastic layer. As an extruder, an extruder having a cylinder diameter of 70 mm and an L/D of was used, making temperature control to 90° C. for its head, 90° C. for its cylinder and 90° C. for its screw at the time of extrusion.

Next, the above roller was vulcanized by using a continuous heating oven having two zones set at different temperatures. A first zone was set at a temperature of 80° C., where the roller was passed therethrough in 30 minutes, and a second zone was set at a temperature of 160° C. and the roller was passed therethrough also in 30 minutes, to obtain a vulcanized conductive elastic roller.

Next, the conductive elastic roller, standing before surface grinding, was cut at its both ends of the conductive elastic layer portion (rubber portion) to make the conductive elastic layer portion have a width of 232 mm in the axial direction. Thereafter, the surface of the conductive elastic layer portion was sanded with a rotary grinding wheel (number of work revolutions: 333 rpm; number of grinding wheel revolutions: 2,080 rpm; sanding time: 12 seconds). Thus, a conductive elastic roller 1 (conductive elastic roller having been surface-sanded) was obtained which had a crown shape of 8.26 mm in diameter at end portions and 8.50 mm in diameter at the middle portion, having a surface ten-point average roughness (Rz) of 5.5 μm, having a run-out of 18 μm and having an Asker-C hardness of 73 degrees.

The ten-point average roughness (Rz) was measured according to JIS B 6101. The run-out was measured with a high-precision laser measuring instrument LSM-430V, manufactured by Mitutoyo Corporation. Stated in detail, the outer diameter was measured with the measuring instrument, and the difference between a maximum outer diameter value and a minimum outer diameter value was regarded as outer-diameter difference run-out. This measurement was made at five spots, and an average value of outer-diameter difference run-out at five spots was regarded as the run-out of the measuring object. The Asker-C hardness was measured in a measurement environment of 25° C./55% RH under conditions of a load of 1,000 g, bringing a loaded needle of an Asker-C hardness meter (manufactured by Koubunshi Keiki Co., Ltd.) into touch with the surface of the measuring object.

(2) Synthesis and Evaluation of Condensation Product:
Condensation Product 1-1

Next, a condensation product 1-1 for forming a surface layer was synthesized.

Synthesis 1: First-Stage Reaction

Components shown in Table 2 below were mixed, and thereafter stirred at room temperature for 30 minutes. Subsequently, heating and reflux were carried out at 120° C. for 20 hours by using an oil bath, to obtain a condensation product intermediate 1.

TABLE 2

| | |
|---|---|
| Glycidoxypropyltrimethoxysilane (GPTMS, simply "EP-1") (hydrolyzable silane compound; trade name: KBM-403; available from Shin-Etsu Chemical Co., Ltd.) | 11.56 g (0.049 mol) |
| Hexyltrimethoxysilane (HeTMS, simply "He") (hydrolyzable silane compound; trade name: KBM-3063; available from Shin-Etsu Chemical Co., Ltd.) | 62.08 g (0.301 mol) |
| Ion-exchanged water | 11.33 g |
| Ethanol (guaranteed; available from Kishida Chemical Co., Ltd.) | 91.82 g |

This condensation product intermediate 1 had a theoretical solid content (the mass ratio of a polysiloxane polymer to solution total weight when the hydrolyzable silane compound was assumed to have undergone dehydration condensation in its entirety) of 28.0% by mass.

Synthesis 2: Second-Stage Reaction

Next, to 88.12 g of the condensation product intermediate 1, having been cooled to room temperature, 81.59 g (0.174 mol) of tetra-n-propoxyzirconium (available from Gelest, Inc.; hereinafter simply "Zr-1") was added, and these were stirred at room temperature for 3 hours to obtain a condensation product 1-1. A sequence of stirring was carried out at 750 rpm. Zr/Si=1.0.

Evaluation (1): Percent Solids of Condensation Product 1-1.

The value of percent solids of the condensation product 1-1 is shown in Table 3. To find the percent solids, the solid content obtained by heating 2.0 g of the condensation product 1 in a 160° C. oven for 30 minutes was measured. The value of percent solids was calculated from the difference between the practical solid content obtained upon heating and the theoretical solid content to calculate the amount of unreacted monomers (residual monomers) remaining in the condensation product 1-1.

Condensation Product 1-2

A condensation product 1-2 was obtained in the same way as the condensation product 1-1 except that the ion-exchanged water was changed for $^{17}O-H_2O$ (7-9.9 atm %; available from Cambridge Isotope Laboratories, Inc. (CIL).

Evaluation (2): (Si—O—Zr)/(Zr—O—Zr) ratio.

Figure 3:
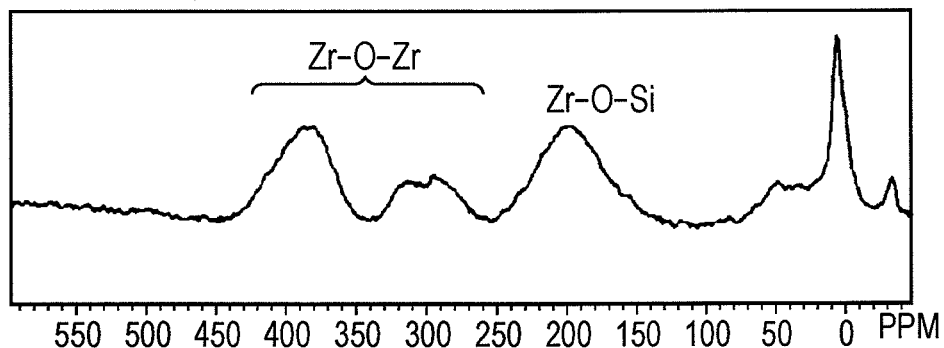
FIG. 3 is a spectrum chart of liquid $^{17}$O-NMR of a condensation product 1-2 in Example 1.

Using the condensation product 1-2 as a measuring sample, measurement by $^{17}O$-NMR (instrument used: ADVANCE 500, manufactured by Bruker Corporation) was made to obtain a spectrum shown in FIG. 3. A peak at 150 ppm to 250 ppm was taken as Si—$^{17}O$—Zr; a peak at 250 ppm to 350 ppm, as $Zr_4{}^{17}O$; and a peak at 350 ppm to 450 ppm, as $Zr_3{}^{17}O$. The sum of areas of $Zr_4{}^{17}O$ and $Zr_3{}^{17}O$ was taken as Zr—$^{17}O$—Zr, and the (Si—O—Zr)/(Zr—O—Zr) ratio was calculated. Also, on this occasion, any Zr—O—H was not identifiable, and did not remain as any monomer because of sufficiently high percent solids in evaluation (1). From this fact, it was considered that there was also no Zr—OR$_{69}$, and it was suggested that Zr is present in the state of the formula (2) in its greater part. Here, R$_{69}$ represents a hydrocarbon group or a hydrocarbon group partly substituted with oxygen or nitrogen.

Condensation Product 1-3

To 25 g of the condensation product 1-1, as a cationic polymerization initiator 2.00 g of an aromatic sulfonium salt (trade name: ADECAOPTOMER SP150; available from Asahi Denka Kogyo K.K.) having been diluted with methanol to 10% by mass was added to obtain a condensation product 1-3.

Evaluation (3): Chemical Structure of Cured Film of Condensation Product 1-3.

Next, using JMN-EX400, manufactured by JEOL Ltd., it was confirmed by $^{29}Si$—NMR and $^{13}C$-NMR measurement that the high-molecular compound constituting a cured film of the condensation product 1-3 had the structure represented by the formula (1).

A dilute solution was prepared which was obtained by diluting the condensation product 1-3 with a mixed solvent of ethanol and 2-butanol (ethanol:2-butanol=1:1) in such a way as to have a theoretical solid content of 7.0% by mass. This dilute solution was dropped onto a sheet made of aluminum (thickness: 100 μm), having been degreased with a ketone and an alcohol, and this was turned at a number of revolutions of 300 rpm for 2 seconds to form a film, followed by drying.

The film having been dried was irradiated with ultraviolet rays of 254 nm in wavelength in such a way as to be in an integral light quantity of 9,000 mJ/cm$^2$) to make the condensation product 1-3 undergo cross-linking. The cross-linked product obtained was peeled from the sheet made of aluminum and then pulverized. The pulverized product obtained was used as a sample for the NMR measurement.

Figure 4:
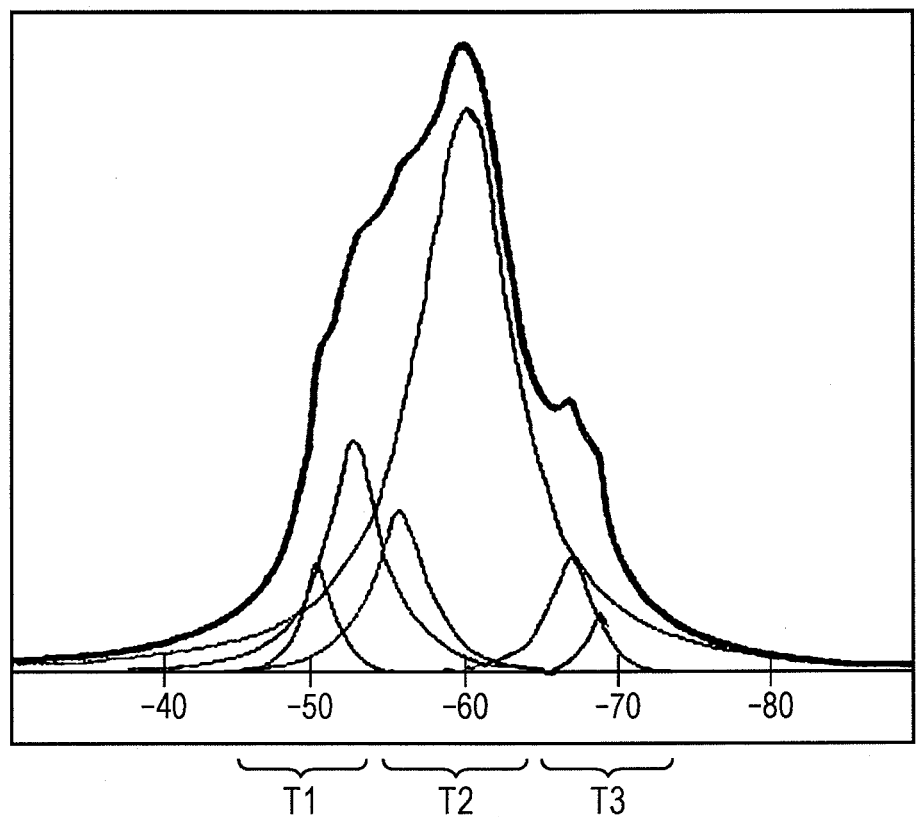
FIG. 4 is a spectrum chart of solid $^{29}$Si—NMR of a condensation product 1-3 in Example 1.
Figure 5:
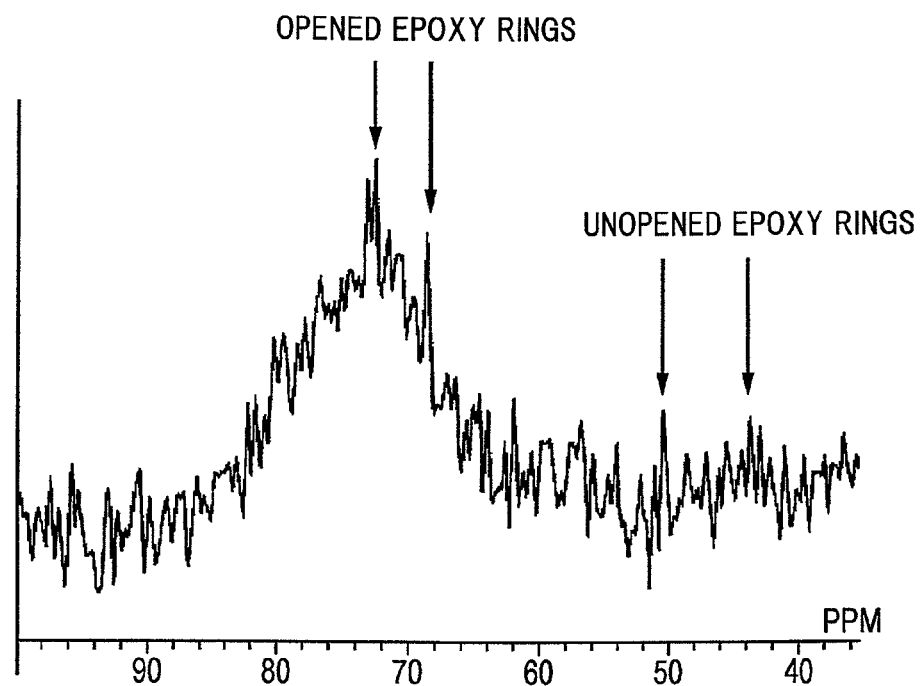
FIG. 5 is a spectrum chart of solid $^{13}$C-NMR of the condensation product 1-3 in Example 1.

A spectrum obtained by $^{29}Si$—NMR measurement is shown in FIG. 4. In the same figure, peaks formed by waveform separation of the spectrum are shown together. A peak in the vicinities of −64 ppm to −74 ppm shows a T3 component. Here, the T3 component shows a state in which the Si having one bond with an organic functional group has three bonds with the other atoms (Si and Zr) through the O. It was confirmed from FIG. 4 that there was a species present in the state of —SiO$_{3/2}$ upon condensation of a hydrolyzable silane compound having organic chains containing epoxy groups. A spectrum obtained by $^{13}$C-NMR measurement is also shown in FIG. 5. Peaks showing epoxy groups before ring-opening appear in the vicinities of 44 ppm and 51 ppm, and peaks after ring-opening polymerization appear in the vicinities of 69 ppm and 72 ppm. It was confirmed from FIG. 5 that the polymerization was effected almost without any unopened epoxy groups remaining. It was confirmed from the above $^{29}$Si—NMR and $^{13}$C-NMR that the cured film had in its interior the structure represented by the formula (1).

Evaluation (4): Degree of Condensation of Cured Film.

The degree of condensation of the cured product of the condensation product 1-3 was calculated from the results of the $^{29}$Si—NMR in Evaluation (3).

Evaluation (5): Modulus of Elasticity of Cured Film.

A cured film of the condensation product 1-3 was formed in a thickness of 10 μm on a sheet made of aluminum, in the same way as the method described in Evaluation (3). Its modulus of elasticity was measured with a surface film physical properties tester (trade name: FISCHER SCOPE H100V; manufactured by Fischer Instruments K.K.). The value found when an indenter was penetrated from the surface of the measuring object at a rate of 1 μm/7 seconds was taken as the modulus of elasticity. Here, as a sample for measuring the modulus of elasticity, the cured film was so controlled as to have a thickness of 10 μm or more.

(3) Formation and Evaluation of Surface Layer

The condensation product 1-3 was diluted with a mixed solvent of ethanol and 2-butanol (ethanol:2-butanol=1:1) in such a way as to have a solid content of 3.0% by mass, to prepare a surface layer forming coating solution 1. Subsequently, using this coating solution 1, a charging roller 1 was produced in the following way.

First, the conductive elastic roller 1 (the one having been surface-sanded) was coated on its conductive elastic layer with the surface layer forming coating solution 1 by ring coating (ejection rate: 0.060 ml/s; speed of ring head: 85 mm/s; total delivery: 0.065 ml). The coating thus formed was irradiated with ultraviolet rays of 254 nm in wavelength in such a way as to be in an integral light quantity of 9,000 mJ/cm$^2$) to cure the coating of the coating solution 1 (curing by cross-linking reaction). In the irradiation with ultraviolet rays, a low-pressure mercury lamp (manufactured by Harison Toshiba Lighting Corporation) was used.

The charging roller 1 thus produced was used to make the following evaluations (6) to (9) each.

Evaluation (6): Identification of Si—O—Zr Linkage of Charging Roller.

The presence of the Si—O—Zr linkage of the surface layer outermost surface of the charging roller 1 was identified by ESCA. Using QUANTUM 2000, manufactured by Ulvac-Phi, Inc., the roller surface was so made as to be irradiated with X-rays to evaluate the manner of linkage inside the surface layer. The presence of the Si—O—Zr linkage was identified from an O1s spectrum detected.

Evaluation (7): External appearance of charging roller.

How the external appearance of the surface of the charging roller 1 stands was judged by visual observation as in the following.

A: A case in which any faulty coating is not seen at all on the surface of the charging roller.

B: A case in which faulty coating has appeared on some part of the surface of the charging roller.

C: A case in which faulty coating has appeared on the whole area of the surface of the charging roller.

Evaluation (8): Thickness of Surface Layer.

The layer thickness of the surface layer formed on the charging roller 1 was measured. A section made by cutting the roller was observed to make measurement. Instrument used: Scanning transmission electron microscope (STEM; trade name: HD-2000; manufactured by Hitachi High-Technologies Corporation).

Evaluation (9): Contact Test of Charging Roller.

Using the charging roller 1, produced in the same way as the above, its contact test was conducted in the following way. The charging roller and the electrophotographic photosensitive member were set in a process cartridge supporting these integrally. Here, these were so set that a load of 1 kg in total was applied to the charging roller. Thereafter, this process cartridge was left to stand in a high-temperature and high-humidity environment (temperature 40° C., humidity 95% RH) for 10 days or 30 days. After the process cartridge was taken out of this environment, it was left to stand in a normal-temperature and normal-humidity environment (temperature 25° C., humidity 50% RH) for 72 hours, and then mounted to a laser beam printer (trade name: HP Color Laser Jet 4700 Printer; manufactured by Hewlett-Packard Co.) for A4-size sheet lengthwise printing. The development system of this laser beam printer is a reverse development system, having a transfer material delivery speed of 164 mm/s and an image resolution of 600 dpi.

Here, the electrophotographic photosensitive member set in the process cartridge together with the charging roller is an organic electrophotographic photosensitive member having a support and formed thereon an organic photosensitive layer of 19.0 μm in layer thickness. Also, this organic photosensitive layer is a multi-layer type photosensitive layer having a charge generation layer and a charge transport layer containing a modified polycarbonate (binder resin) which layers are superposed in this order from the support side, and this charge transport layer serves as the surface layer of the electrophotographic photosensitive member.

A toner used in the above laser beam printer is what is called a polymerization toner, which has a glass transition temperature of 63° C. and a volume-average particle diameter of 6 μm. This polymerization toner comprises toner particles which are particles obtained by subjecting a polymerizable monomer system containing a wax, a charge control agent, a dye and styrene, butyl acrylate and ester monomers, to suspension polymerization in an aqueous medium, and to which fine silica particles and fine titanium oxide particles are externally added.

A line on images which was caused by any contact mark made as a result of the contact test of the charging roller was examined to make evaluation according to criteria (herein "C-set ranks") as shown below. The length noted in the following evaluation refers to the length of a line in the lateral direction on an A4-lengthwise sheet, and the line is about 1 mm in diameter.

5.0: Any line is not seen at all on images.
4.5: The line is little seen on images.
4.0: The line can be seen on images at their edges, but is light and about 4 to 5 mm in length.
3.5: The line can be seen on images at their edges, and is less than 15 mm in length.
3.0: The line can be seen on images at their edges, and is less than 30 mm in length.
2.0: The line is 30 mm or more to less than 30 mm in length.
1.0: The line is 70 mm or more in length.

Evaluation (10): Coefficient of Dynamic Friction of Charging Roller.

Figure 6:
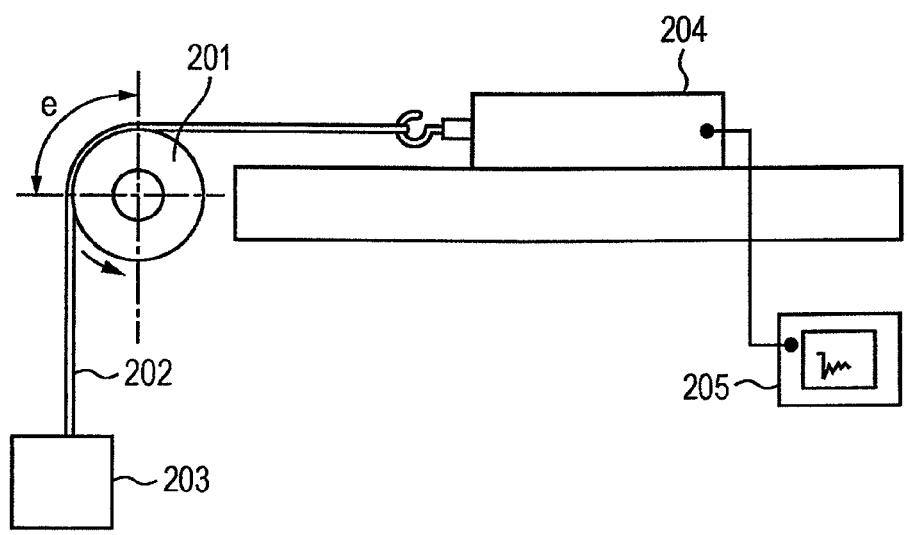
FIG. 6 is an illustration of a measuring instrument used in measuring the coefficient of dynamic friction.

The coefficient of dynamic friction of the charging roller 1 was measured with a set of measuring equipment for coefficient of dynamic friction as shown in FIG. 6. In the FIG. 6 equipment, a measuring object charging member 201 is brought into contact with a belt 202 (thickness: 100 μm: width: 30 mm; length: 180 mm; made of polyethylene terephthalate (PET); trade name: LUMILAR S10, #100; available from Toray Industries, Inc.) at a stated angle θ. The belt 202 is also joined with a weight 203 at one end thereof and a load meter 204 at the other end. The load meter 204 is connected with a recorder 205.

When in the state as shown in FIG. 6 the charging member 201 is rotated in a stated direction and at a stated speed, the force measured with the load meter 204 is represented by F (g weight) and the sum of the weight of the weight 203 and the weight of the belt 202 is represented by W (g weight), where the coefficient of friction is found according to the following expression. Incidentally, this measuring method is based on the Euler's belt formula.

Coefficient of friction=$(1/\theta)\ln(F/W)$.

In the present invention, the value of W was set to be W=100 (g weight), the rotational speed of the charging member was set to be 115 rpm, and the measurement was made in an environment of 23° C./50% RH.

Evaluation (11): Running Test of Charging Roller.

The charging roller and the electrophotographic photosensitive member were set in the process cartridge in the same way as Evaluation (9) and the same printer was used to conduct a running test to make evaluation on whether or not the charging roller came stained as a result of running. Images were reproduced in a normal-temperature and normal-humidity environment (temperature 25° C., humidity 50% RH), where an E-letter pattern of 1% in print percentage was formed on an A4-size sheet, and was reproduced in an intermittent mode in which the printer was idled for 4 seconds at intervals of 2 sheets. The image reproduction in an intermittent mode comes to a larger number of times of friction between the charging member and the electrophotographic photosensitive member than any continuous papering (paper supply) even in papering in the same number of sheets, and hence severer evaluation is made for the evaluation on the staining of the charging member surface. Under these conditions, this pattern was reproduced on 4,000 sheets at a process speed of 164 mm/s. The images reproduced were evaluated by visually observing the images reproduced and the charging roller standing after the running test.

Evaluation Criteria for the Images are as Follows:
A: Charging non-uniformity caused when the toner and its external additive stick fast to the surface of the charging roller at its portions where any coat non-uniformity or coat streaks is/are made at the time of coating can little be seen on the images reproduced.
B: Charging non-uniformity caused when the toner and its external additive stick fast to the surface of the charging roller at its portions where any coat non-uniformity or coat streaks is/are made at the time of coating can be seen on the images reproduced.
C: Charging non-uniformity caused when the toner and its external additive stick fast to the surface of the charging roller at its portions where any coat non-uniformity or coat streaks is/are made at the time of coating can be seen on the images reproduced, and this charging non-uniformity occurs greatly, stated specifically, to such an extent that charging non-uniformity can be seen in the shape of white vertical streaks.

Evaluation Criteria for the Roller are as Follows:
A: Any stains (deposits) can not be seen in visual observation.
B: Stains can be seen only at roller end portions.
C: Stains can be seen over the whole roller surface.

Examples 2 to 20

Charging rollers 2 to 20 were produced in the same way as Example 1 except that the components in Synthesis 1 and Synthesis 2 were formulated in amounts changed to the values shown in Table 3. Symbols noted in Table 3 are those detailed as shown in Table 6.

The modulus of elasticity of the cured film according to Examples 5, 7, 8 and 11 each, shown in Table 3, was not measured. The reason therefor was that the film of 10 μm in thickness for measuring the modulus of elasticity came to crack. This was considered due to the fact that the Zr as being tetra-functional was in a large quantity. However, this was not an obstacle to the formation of the surface layer because the surface layer formed by applying the coating agent onto the conductive elastic roller was a film greatly thinner than the cured film for measuring the modulus of elasticity and also had a great adherence between the conductive elastic layer and the condensation product. Physical properties and test results other than the modulus of elasticity were evaluated as usual. This also applies in regard to Comparative Example 2 given later.

The presence of the structure of the formula (1) was verified by Evaluation (3) in all Examples. The presence of the Si—O—Zr linkage was also verified by Evaluation (6) in all Examples.

Comparative Example 1

Composition and amounts of raw materials used for the reaction are shown in Table 4. More specifically, a hydrolysis condensation product was synthesized without use of any hydrolyzable zirconium compound. About the hydrolysis condensation product obtained, the value of percent solids was calculated in the same way as the above Evaluation (1). Next, about this hydrolysis condensation product, a cured film was formed in the same way as the above Evaluation (3) except that, in Evaluation (3), the film having been dried was heated at 250° C. for 1 hour in place of the irradiation with ultraviolet rays. Its chemical structure was indentified in the same way. About this cured film, the degree of condensation was calculated and the modulus of elasticity was measured in the same ways as the above Evaluations (4) and (5), respectively. Incidentally, in this Comparative Example, Evaluation (2) was not made because any hydrolyzable zirconium compound was not used in the raw materials.

Next, using the hydrolysis condensation product according to this Comparative Example, a coating solution was prepared by the method described in the item (3) of Example 1, and the conductive elastic roller 1 was coated with this coating solution. Thereafter, the coating formed was heated at 250° C. for 1 hour in place of the irradiation with ultraviolet rays in the item (3) of Example 1, to cure the coating film of the coating solution to form a surface layer. Thus, a charging roller according to this Comparative Example was produced. This charging roller was evaluated in the same ways as the above Evaluations (6) to (11).

Comparative Example 2

Composition and amounts of raw materials used for the reaction are shown in Table 4. More specifically, in this Comparative Example, any hydrolyzable silane compound was not added, and tetra-n-propoxyzirconium (Zr-1) was added to water and ethanol, where these were stirred at room temperature for 3 hours to obtain a hydrolysis condensation product.

Evaluation was made on the respective items in the same way as Comparative Example 1 except that this hydrolysis condensation product was used. In this Comparative Example, however, Evaluations (2) and (3) were not made because any hydrolyzable silicon compound was not used in the raw materials. About Evaluation (5) as well, the evaluation was also not made because it was unable to form any uniform film of 10 μm in thickness that was necessary for measuring the modulus of elasticity.

Comparative Example 3

Composition and amounts of raw materials used for the reaction are shown in Table 4. More specifically, a both-end silanol-terminated polydimethylsiloxane ("PDS" in Table 4; trade name: DMS-S12; available from Gelest, Inc.; molecular weight: 400 to 700) was used as a raw material of hydrolyzable silica to obtain a condensation product of a hydrolyzable silane compound. Also, in carrying out the hydrolysis and condensation of this condensation product with a hydrolyzable zirconium compound (Synthesis 2), Zr-1 was so added as to be Zr/Si=1.0 when the molecular weight of the PDS was 550. A condensation product was obtained in the same way as Example 1 except for these.

Evaluation was made on the respective items in the same way as Comparative Example 1 except that this condensation product was used. In this Comparative Example, however, Evaluation (2) was not made because a bifuncitonal hydrolyzable silane compound was used in the raw materials and hence the condensation reaction by hydrolysis with the hydrolyzable zirconium compound did not easily take place, resulting in a very low proportion of the Si—O—Zr linkage.

The results of evaluation in the above Examples to 20 are shown in Table 5-1, and the results of evaluation in Comparative Examples 1 to 3 are shown in Table 5-2.

TABLE 3

| | Amount (g) of raw materials added | | | | | | | | | | | |
|---|---|---|---|---|---|---|---|---|---|---|---|---|
| | Composition in Synthesis 1 | | | | | | | | Composition in Synthesis 2 | | | |
| | Component (A) | | | | Component (B) | | | | First = stage reaction product | Component (C) | | Zr/Si molar |
| Example: | EP-1 | EP-2 | EP-3 | EP-4 | He | Ph | Water | EtOH | acc. to Synthesis 1 | Zr-1 | Zr-2 | ratio | * $R_{OR}$ |
| 1 | 11.56 | — | — | — | 62.08 | — | 11.33 | 91.82 | 88.12 | 81.59 | — | 1.0 | 1.8 |
| 2 | 11.56 | — | — | — | 62.08 | — | 11.33 | 91.82 | 114.56 | 53.03 | — | 0.5 | 1.8 |
| 3 | 11.56 | — | — | — | 62.08 | — | 11.33 | 91.82 | 46.31 | 128.63 | — | 3.0 | 1.8 |
| 4 | 11.56 | — | — | — | 62.08 | — | 11.33 | 91.82 | 156.08 | 14.45 | — | 0.1 | 1.8 |
| 5 | 11.56 | — | — | — | 62.08 | — | 11.33 | 91.82 | 30.53 | 141.36 | — | 5.0 | 1.8 |
| 6 | 11.56 | — | — | — | 62.08 | — | 11.33 | 91.82 | 146.47 | 6.78 | — | 0.1 | 1.8 |
| 7 | 11.56 | — | — | — | 62.08 | — | 11.33 | 91.82 | 26.81 | 148.92 | — | 6.0 | 1.8 |
| 8 | 11.56 | — | — | — | 62.08 | — | 3.78 | 99.38 | 31.18 | 144.36 | — | 5.0 | 0.6 |
| 9 | 11.56 | — | — | — | 62.08 | — | 3.78 | 99.38 | 44.89 | 124.69 | — | 3.0 | 0.6 |
| 10 | 11.56 | — | — | — | 62.08 | — | 7.56 | 95.60 | 84.73 | 78.45 | — | 1.0 | 1.2 |
| 11 | 11.56 | — | — | — | 62.08 | — | 7.56 | 95.60 | 30.12 | 139.42 | — | 5.0 | 1.2 |
| 12 | 11.56 | — | — | — | 62.08 | — | 18.89 | 84.27 | 132.56 | 12.27 | — | 0.1 | 3.0 |
| 13 | 11.56 | — | — | — | 62.08 | — | 18.89 | 84.27 | 81.58 | 75.54 | — | 1.0 | 3.0 |
| 14 | 11.56 | — | — | — | 62.08 | — | 37.78 | 65.38 | 91.04 | 84.30 | — | 1.0 | 6.0 |
| 15 | — | 9.83 | — | — | 64.91 | — | 11.85 | 80.38 | 86.55 | 88.71 | — | 1.0 | 1.8 |
| 16 | — | — | 15.00 | — | 59.69 | — | 10.90 | 76.21 | 88.86 | 86.44 | — | 1.0 | 1.8 |
| 17 | — | — | — | 11.94 | 61.45 | — | 11.22 | 80.24 | 85.48 | 84.02 | — | 1.0 | 1.8 |
| 18 | 12.15 | — | — | — | — | 65.25 | 11.91 | 22.24 | 70.60 | 99.31 | — | 1.0 | 1.8 |
| 19 | 69.96 | — | — | — | — | — | 9.60 | 97.24 | 88.89 | 69.74 | — | 1.0 | 1.8 |
| 20 | 11.56 | — | — | — | 62.08 | — | 11.33 | 91.82 | 87.71 | — | 67.94 | 1.0 | 1.8 |

* $R_{OR}$ = (D)/[(A) + (B)], molar ratio

TABLE 4

| | Amount (g) of raw materials added | | | | | | | | |
|---|---|---|---|---|---|---|---|---|---|
| | Composition in Synthesis 1 | | | | | Composition in Synthesis 2 | | | |
| Comparative Example: | He | PDS | Water | EtOH | Zr-1 | First-stage reaction product acc. to Synthesis 1 | Zr-1 | Zr/Si molar ratio | * $R_{OR}$ |
| 1 | 74.37 | — | 11.68 | 90.75 | — | — | — | — | 1.8 |
| 2 | — | — | 7.62 | 59.20 | 109.98 | — | — | — | — |
| 3 | — | 7.11 | 7.52 | 107.76 | 54.41 | 122.39 | 54.41 | 1.0 | — |

* $R_{OR}$ = (D)/[(A) + (B)], molar ratio

TABLE 5-1

| Example: | Ev. (1) Percent solids (%) | Ev. (2) Si—O—Zr/ Si—O—Si | Ev. (4) DC (%) | Ev. (5) Modulus of elasticity (Mpa) | Ev. (7) External appearance | Ev. (8) Layer thickness (nm) | Ev. (9) C-set ranks 10 days | Ev. (9) C-set ranks 30 days | Ev. (10) Coefficient of dynamic friction | Ev. (11) After running Images | Ev. (11) After running Roller |
|---|---|---|---|---|---|---|---|---|---|---|---|
| 1 | 103 | 0.66 | 64 | 3,000 | A | 55 | 5.0 | 4.5 | 2.1 | A | A |
| 2 | 105 | 0.70 | 58 | 2,500 | A | 50 | 4.5 | 4.0 | 2.5 | B | B |
| 3 | 110 | 0.45 | 62 | 7,000 | A | 60 | 4.5 | 4.5 | 2.1 | A | A |
| 4 | 98 | 0.84 | 55 | 1,800 | A | 30 | 4.0 | 3.5 | 2.9 | B | B |
| 5 | 102 | 0.12 | 60 | * | B | 70 | 4.5 | 4.5 | 2.0 | B | A |
| 6 | 105 | 0.85 | 43 | 800 | A | 25 | 3.0 | 3.0 | 2.8 | B | B |
| 7 | 101 | 0.08 | 58 | * | B | 90 | 4.5 | 4.5 | 1.9 | B | A |
| 8 | 98 | 0.15 | 53 | * | B | 55 | 3.5 | 3.0 | 2.0 | B | B |
| 9 | 100 | 0.47 | 56 | 1,100 | A | 50 | 3.0 | 3.0 | 2.2 | A | A |
| 10 | 102 | 0.68 | 58 | 1,500 | A | 50 | 3.5 | 3.0 | 2.3 | A | A |
| 11 | 100 | 0.16 | 57 | * | B | 60 | 4.0 | 3.5 | 2.0 | B | B |
| 12 | 95 | 0.70 | 59 | 3,400 | A | 40 | 3.5 | 3.5 | 2.7 | B | B |
| 13 | 110 | 0.56 | 68 | 5,200 | A | 70 | 4.5 | 4.0 | 2.2 | B | B |
| 14 | 110 | 0.58 | 70 | 7,200 | B | 85 | 4.0 | 4.0 | 2.4 | B | B |
| 15 | 105 | 0.65 | 64 | 2,900 | A | 55 | 4.5 | 4.0 | 2.1 | A | A |
| 16 | 103 | 0.65 | 60 | 3,200 | A | 55 | 4.5 | 4.5 | 2.1 | A | A |
| 17 | 104 | 0.66 | 62 | 3,500 | A | 60 | 4.5 | 4.5 | 2.1 | A | A |
| 18 | 103 | 0.67 | 58 | 3,800 | A | 55 | 4.5 | 4.0 | 2.1 | A | A |
| 19 | 105 | 0.65 | 59 | 3,400 | A | 60 | 4.5 | 4.5 | 2.4 | B | B |
| 20 | 105 | 0.68 | 63 | 3,100 | A | 65 | 4.0 | 4.0 | 2.3 | A | A |

* Not measured as being unable to form any uniform film of 10 μm thick for measuring the modulus of elasticity.
Ev.: Evaluation

TABLE 5-2

| Comparative Example: | Ev. (1) Percent solids (%) | Ev. (2) Si—O—Zr/ Si—O—Si | Ev. (3) DC (%) | Ev. (5) Modulus of elasticity (Mpa) | Ev. (7) External appearance | Ev. (8) Layer thickness (nm) | Ev. (9) C-set ranks 10 days | Ev. (9) C-set ranks 30 days | Ev. (10) Coefficient of dynamic friction | Ev. (11) After running Images | Ev. (11) After running Roller |
|---|---|---|---|---|---|---|---|---|---|---|---|
| 1 | 60 | — | 28 | 1,000 | C | 30 | 2.0 | 1.0 | 3.2 | C | C |
| 2 | 100 | — | — | * | C | 200 | 2.0 | 2.0 | 1.8 | C | C |
| 3 | 104 | — | 42 | 300 | B | 180 | 2.0 | 1.0 | 2.6 | C | B |

* Not measured as being unable to form any uniform film of 10 μm thick for measuring the modulus of elasticity.
Ev.: Evaluation

TABLE 6

| Notation in Table 3 | Chemical name | Structure | Maker | Mw | Concentration |
|---|---|---|---|---|---|
| EP-1 | 3-glycidoxypropyltri-methoxysilane | (epoxide)—(CH$_2$)—O—(CH$_2$)$_3$—Si(OMe)$_3$ | Shin-Etsu Chemical | 236 | 100% |
| EP-2 | 4-(1,2-epoxybutyl) trimethoxysilane | (epoxide)—(CH$_2$)$_2$—Si(OMe)$_3$ | Carbone Scientific | 192 | 100% |
| EP-3 | 8-oxysilan-2-yl octyltriethoxysilane | (epoxide)—(CH$_2$)$_8$—Si(OEt)$_3$ | SiKEMIA | 319 | 100% |
| EP-4 | 1-(3,4-epoxycyclo-hexyl)ethyltrimethoxy-silane | (epoxycyclohexyl)—(CH$_2$)$_2$—Si(OMe)$_3$ | Shin-Etsu Chemical | 246 | 100% |

TABLE 6-continued

| Notation in Table 3 | Chemical name | Structure | Maker | Mw | Concentration |
|---|---|---|---|---|---|
| He | Hexyltrimethoxysilane | $H_3C-(CH_2)_5-Si(OMe)_3$ | Shin-Etsu Chemical | 206 | 100% |
| Ph | Phenyltriethoxysilane | 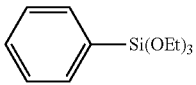 | Shin-Etsu Chemical | 240 | 100% |
| Zr-1 | Zirconium n-propoxide | $Zr-(O-n-Pr)_4$ | Gelest | 328 | 70% |
| Zr-2 | Zirconium t-butoxide | $Zr-(O-t-Bu)_4$ | Gelest | 384 | 98% |

Me: methyl group; Et: ethyl group; Pr: propyl group; Bu: butyl group

Reference Signs List
101 substrate
102 conductive elastic layer
103 surface layer
1 electrophotographic photosensitive member
2 shaft
3 charging member (charging roller)
4 exposure light
5 developing means
6 transfer means
7 cleaning means
8 fixing means
9 process cartridge
10 guide means
P transfer material
201 charging member (charging roller)
202 belt
203 weight
204 load meter
205 recorder While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-182285, filed on Aug. 17, 2010, which is herein incorporated by reference as part of this application.

What is claimed is:

1. A charging member comprising a substrate, an elastic layer and a surface layer;
wherein;
the surface layer comprises a high-molecular compound having a constituent unit represented by the following formula (1) and a constituent unit represented by the following formula (2), and having an Si—O—Zr linkage:

Formula (1)

$$\left(\begin{array}{cc} R_1-O-R_2-O \\ | & | \\ SiO_{3/2} & SiO_{3/2} \end{array}\right)$$

Formula (2)

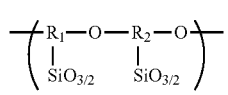

wherein $R_1$ and $R_2$ each independently represent any of structures represented by the following formulas (3) to (6):

Formula (3)

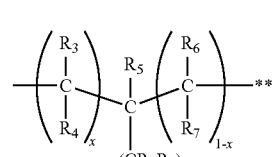

Formula (4)

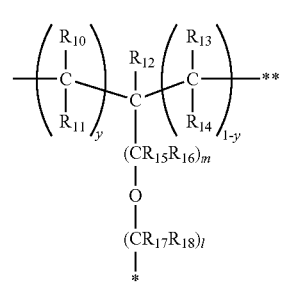

Formula (5)

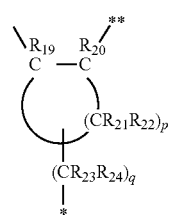

Formula (6)

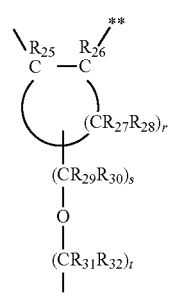

where, in the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom or an alkoxyl group or alkyl group having 1 to 4 carbon atom(s); n, m, l, q, s and t each independently represent an integer of 1 or more to 8 or less, p and r each independently represent an integer of 4 to 12, and x and y each independently represent 0 or 1; and an asterisk * and a double asterisk ** each represent the position of bonding with the silicon atom and oxygen atom, respectively, in the formula (1).

2. The charging member according to claim 1, wherein $R_1$ and $R_2$ in the formula (1) is any structure selected from structures represented by the following formulas (7) to (10):

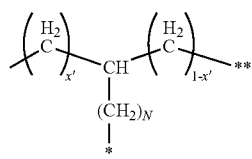

Formula (7)

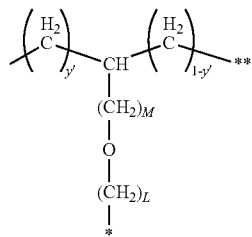

Formula (8)

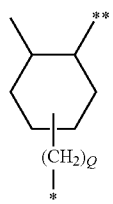

Formula (9)

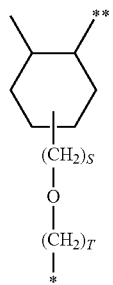

Formula (10)

where, in the formulas (7) to (10), N, M, L, Q, S and T each independently represent an integer of 1 or more to 8 or less, and x' and y' each independently represent 0 or 1.

3. The charging member according to claim 1 or 2, wherein, in the high-molecular compound, the ratio of the number of atoms of zirconium to that of silicon, Zr/Si, is from 0.1 or more to 5.0 or less.

4. The charging member according to claim 1, wherein the high-molecular compound is a cross-linked product of a hydrolyzable compound represented by the formula (11) and a hydrolyzable compound represented by the formula (12):

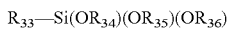

Formula (11)

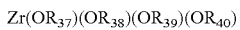

Formula (12)

where, in the formula (11), $R_{33}$ represents any structure selected from structures represented by the following formulas (13) to (16); $R_{34}$ to $R_{36}$ each independently represent an alkyl group having 1 to 4 carbon atom(s); and, in the formula (12), $R_{37}$ to $R_{40}$ each independently represent an alkyl group having 1 to 9 carbon atom(s):

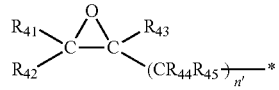

Formula (13)

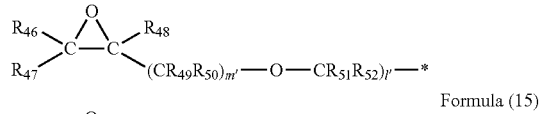

Formula (14)

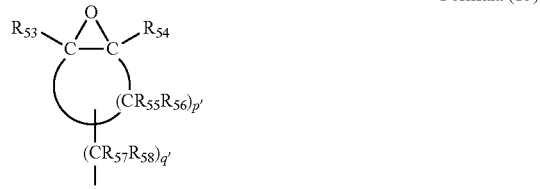

Formula (15)

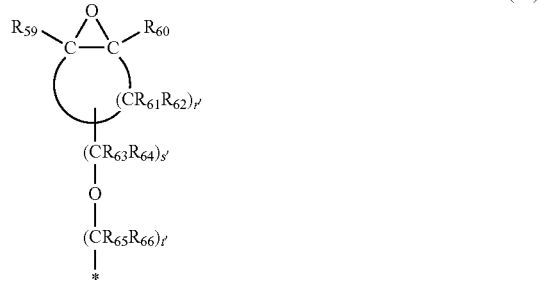

Formula (16)

where, in the general formulas (13) to (16), $R_{41}$ to $R_{43}$, $R_{46}$ to $R_{48}$, $R_{53}$, $R_{54}$, $R_{59}$ and $R_{60}$ each independently represent a hydrogen atom, a straight-chain or branched-chain alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or an alkyl group having 1 to 4 carbon atom(s); $R_{55}$, $R_{56}$, $R_{61}$ and $R_{62}$ each independently represent a hydrogen atom, an alkoxyl group having 1 to 4 carbon atom(s) or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom in the general formula (11).

5. The charging member according to claim 4, wherein the high-molecular compound is a cross-linked product of the hydrolyzable compounds represented by the formulas (11) and (12) and a hydrolyzable compound represented by the following general formula (17):

$R_{67}$—Si(O$R_{68}$)(O$R_{69}$)(O$R_{70}$)   Formula (17)

wherein $R_{67}$ represents an alkyl group having 1 to 21 carbon atom(s) or a phenyl group, and $R_{68}$ to $R_{70}$ each independently represent an alkyl group having 1 to 6 carbon atom(s).

6. A process for producing the charging member according to claim 5; the process comprising the steps of:

forming on the elastic layer a coating film of a coating material containing a hydrolysis condensation product synthesized from the hydrolyzable compound represented by the formula (11) and the hydrolyzable compound represented by the formula (12); and cleaving epoxy groups of the hydrolysis condensation product to effect cross-linking of the hydrolysis condensation product to form the surface layer.

7. An electrophotographic apparatus comprising an electrophotographic photosensitive member and a charging member according to claim 1, the charging member being in contact with the electrophotographic photosensitive member.

* * * * *